United States Patent
Yasuda et al.

(10) Patent No.: US 6,943,928 B1
(45) Date of Patent: Sep. 13, 2005

(54) ELECTROMAGNETIC ACTUATOR, MANUFACTURING METHOD, AND OPTICAL SCANNER USING THE ELECTROMAGNETIC ACTUATOR

(75) Inventors: Susumu Yasuda, Machida (JP); Futoshi Hirose, Atsugi (JP)

(73) Assignee: Canon Kabushiki Kaisha, Tokyo (JP)

(*) Notice: Subject to any disclaimer, the term of this patent is extended or adjusted under 35 U.S.C. 154(b) by 316 days.

(21) Appl. No.: 09/654,394

(22) Filed: Sep. 1, 2000

(30) Foreign Application Priority Data

Sep. 3, 1999 (JP) ................................ 11-250281

(51) Int. Cl.⁷ ............................................. G02B 26/08
(52) U.S. Cl. ..................................................... 359/224
(58) Field of Search ............................. 359/224, 225, 359/198, 199, 877; 310/12, 14

(56) References Cited

U.S. PATENT DOCUMENTS

| | | | |
|---|---|---|---|
| 5,025,346 A * | 6/1991 | Tang et al. .............. 361/283.1 |
| 5,539,267 A | 7/1996 | Fan et al. ..................... 310/309 |
| 5,629,918 A | 5/1997 | Ho et al. ...................... 369/112 |
| 5,710,466 A | 1/1998 | Allen et al. .................... 310/40 |
| 5,724,015 A | 3/1998 | Tai et al. ....................... 335/78 |
| 6,329,737 B1 * | 12/2001 | Jerman et al. .............. 310/309 |
| 6,563,238 B1 * | 5/2003 | Lee et al. ..................... 310/15 |

FOREIGN PATENT DOCUMENTS

| | | |
|---|---|---|
| GB | 2156590 A | 10/1985 |
| WO | WO 96/11484 | 4/1996 |

* cited by examiner

*Primary Examiner*—Euncha P. Cherry
(74) *Attorney, Agent, or Firm*—Fitzpatrick, Cella, Harper & Scinto

(57) ABSTRACT

An electromagnetic actuator comprises a core with a coil wound around a stator magnetically coupled to each end of the cored a movable element that can be displaced relative to the stator, and a supporting means for supporting the movable element. The stator and the movable element each have a projection and a depression parallel to the displacement direction of the movable element and are placed in such a way that the projection and depression of the stator engage with the projection and depression of the movable element.

9 Claims, 7 Drawing Sheets

ELECTROMAGNETIC ACTUATOR, MANUFACTURING METHOD, AND OPTICAL SCANNER USING THE ELECTROMAGNETIC ACTUATOR

BACKGROUND OF THE INVENTION

1. Field of the Invention

The present invention relates to an electromagnetic actuator as an electro-mechanical converter using electromagnetic force, optical scanner and manufacturing method. More particularly, the present invention relates to a micro-electromagnetic actuator, which can be manufactured by a micro-machining technology, being easier to control and able to have larger strokes than a conventional electromagnetic actuator, and its manufacturing method.

2. Related Background Art

The mainstream of actuators manufactured by conventional micro-machining technologies has been actuators using an electrostatic force or piezoelectric phenomenon. However, actuators using electromagnetic power are also increasingly being developed as it is becoming easier to use magnetic materials by a micro-machining technology in recent years.

Figure 7:
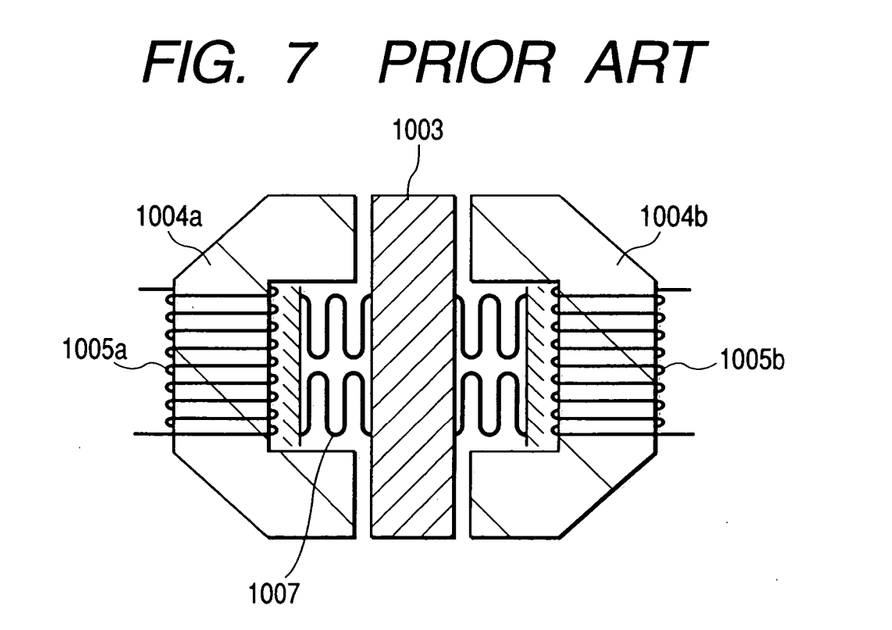
FIG. 7 is a drawing to explain a micro-electromagnetic actuator of prior art.

FIG. 7 is an example of an electromagnetic linear actuator for positioning a hard disk head (U.S. Pat. No. 5,724,015). The actuator in FIG. 7 comprises fixed cores 1004a and 1004b, coils 1005a and 1005b wound around the fixed cores fixed on a substrate (not shown in the figure) and a movable element 1003 supported by means of a spring 1007 in such a way that the movable element 1003 is movable relative to the fixed cores 1004a and 1004b. These structures are manufactured on the substrate using a micro-machining technology.

When the coil 1005a of this actuator is energized, the movable element 1003 is attracted to the fixed core 1004a and the movable element 1003 moves leftward in the figure. On the contrary, when the coil 1005b is energized, the movable element 1003 moves rightward in the figure. The force $F_1$ generated by this actuator is given by the following expression:

$$F_1 = 0.5 \mu_0 N_1^2 i_1^2 w_1 t_1 x_1^{-2} \quad (1)$$

where $\mu_0$ is vacuum magnetic permeability; $N_1$, the number of coil turns; $i_1$, a current that flows through the coils 1005a and 1005b; w1, width of the magnetic pole; $t_1$, thickness of the magnetic pole; and $x_1$, length of the gap. The displacement of this actuator is calculated from the following relationship, where the spring constant of the spring 1007 is assumed to be $k_1$:

$$F_1 = k_1 x_1 \quad (2)$$

However, as is clear from expression (1), with the actuator above, the generated force $F_1$ is not determined by the current $i_1$ alone and is inversely proportional to the square of the gap $x_1$. Thus, the actuator above has a problem that it is hard to control.

Another problem is that when the initial gap is increased, the generated force reduces suddenly, making it impossible to increase strokes.

SUMMARY OF THE INVENTION

The present invention has been implemented to solve the above problems of the prior arts and it is an object of the present invention to provide an electromagnetic actuator, optical scanner and their manufacturing method capable of facilitating control over the electromagnetic actuator manufactured by micro-machining technology and increasing strokes.

The above object will be achieved by an electromagnetic actuator comprising:
 a core with a coil wound around;
 a stator magnetically coupled at both ends of the core;
 a movable element that can be displaced relative to the stator; and
 a supporting means for supporting the movable element,
 wherein the stator and the movable element each have a projection and a depression perpendicular to their respective displacement directions and are placed in such a way that the projection and depression of the stator engage with the projection and depression of the movable element.

The above object will also be achieved by an optical scanner comprising a movable mirror and the electromagnetic actuator mechanically connected with the movable mirror.

Furthermore, the above object will also be achieved by a method of manufacturing the electromagnetic actuator with a process of manufacturing the stator, the movable element and the supporting means, comprising:
 a step of forming a sacrificial layer on a substrate;
 a step of forming an electrode layer on the substrate and the sacrificial layer;
 a step of forming an insulated female mold layer on the electrode layer;
 a step of electroplating a magnetic layer in an opening of the insulated female mold layer on the electrode layer; and
 a step of removing the insulated female mold layer and the sacrificial layer.

The method of manufacturing the above electromagnetic actuator with a process of manufacturing the core and the coil comprising:
 a step of forming a coil lower wiring on the substrate;
 a step of forming a first insulating layer on the coil lower wiring;
 a step of forming an electrode layer on the first insulating layer;
 a step of forming an insulated female mold layer on the electrode layer;
 a step of electroplating a magnetic layer in the opening of the insulated female mold layer on the electrode layer;
 a step of forming a second insulating layer on the magnetic layer; and
 a step of forming coil upper wiring on the second insulating layer.

Details will be given in the embodiments, which will be described later.

BRIEF DESCRIPTION OF THE DRAWINGS

FIGS. 3AM, 3AC, 3BM, 3BC, 3CM, 3CC, 3DM, 3DC, 3EM, 3EC, 3FM, 3FC, 3GM, 3GC, 3HM, 3HC, 3IM, 3IC,

3JM and 3JC are drawings to explain a manufacturing method of Embodiment 1 of the present invention;

DETAILED DESCRIPTION OF THE PREFERRED EMBODIMENTS

Embodiments of the present invention will be explained below.

Figure 2:
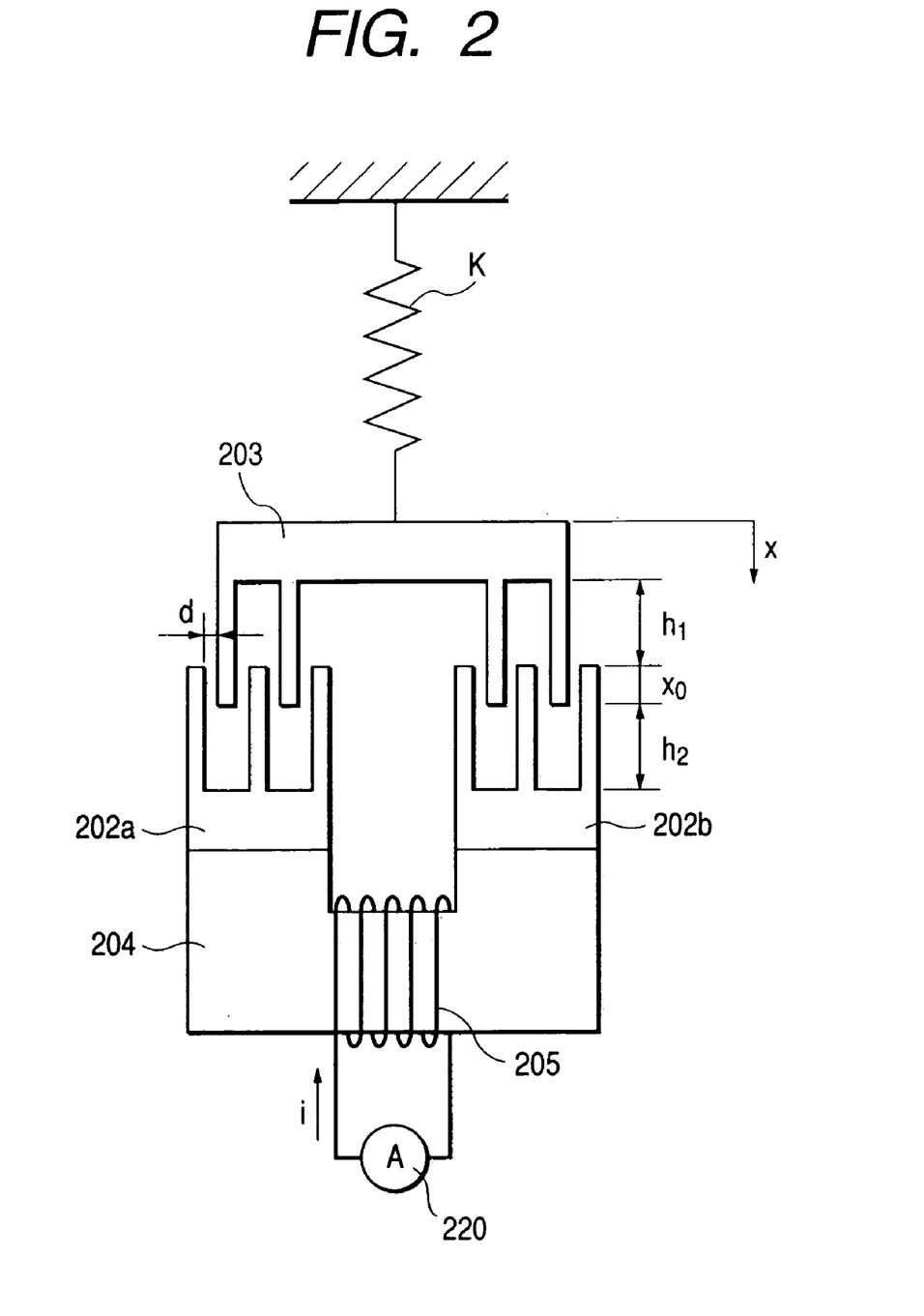
FIG. 2 is a drawing to explain the principle of operation of the present invention.

FIG. 2 is a drawing to explain the principle of operation of the electromagnetic actuator according to an embodiment of the present invention. When a current is supplied from a power supply 220 to a coil 205, magnetic flux is generated in the coil 205. This magnetic flux goes through a magnetic circuit comprised of a core 204, a fixed magnetic pole 202a, air gaps between the comb teeth, a movable magnetic pole 203, the other air gaps between the comb teeth and a fixed magnetic pole 202b, in this order. Reference character K denotes a hinge spring.

Here, magnetic resistance $R_g(x)$ of the air gaps between the comb teeth is given:

$$R_g(x) = \frac{d}{\mu_0 tn(x+x_0)}, \quad (3)$$

where $\mu_0$ is vacuum magnetic permeability; d, distance of the air gap; t, thickness of the comb teeth; n, the number of gaps; x, displacement of the movable magnetic pole; and $x_0$, initial overlap length. Potential energy W of the entire magnetic circuit and generated force F in the air gaps are expressed:

$$W = -\frac{1}{2}(R + 2R_g(x))^{-1}(Ni)^2 = -\frac{(Ni)^2}{2}\left(R + \frac{2d}{\mu_0 tn(x+x_0)}\right)^{-1} \quad (4)$$

$$F = -\frac{dW}{dx} = \frac{1}{2}\left(\frac{2d}{\mu_0 tn(x+x_0)^2}\right)\left(R + \frac{2d}{\mu_0 tn(x+x_0)}\right)^{-2}(Ni)^2 \quad (5)$$

where R is the magnetic resistance of the area other than the air gaps; N is the number of turns of the coil 205; and i is a current that flows into the coil 205. Here, if the actuator is manufactured with a material with magnetic permeability sufficiently large compared to vacuum magnetic permeability, then R approximates to O and the generated force F is given:

$$F = \frac{\mu_0 tn}{4d}(Ni)^2 \quad (6)$$

The equation makes it clear that the generated force F of the actuator of the present invention is determined only by current i but independent of displacement x. In fact, the magnetic permeability cannot become infinite, and therefore the generated force F fluctuates according to displacement x, but the percentage of the fluctuation is extremely small compared to the actuator shown in FIG. 7. That is, its control is extremely easy compared to the conventional electromagnetic actuator. In order for such a condition to be established, the magnetic flux that flows through the air gaps between the comb teeth must be sufficiently dominant compared to the magnetic flux that flows from the end of the comb teeth. Namely, $h_1$ and $h_2$ in FIG. 2 must be sufficiently large compared to d. It is preferable that $h_1$ and $h_2$ be at least twice as large as d.

At this time, a static displacement of the actuator can be calculated according to the balance between the spring force and the generated force from:

$$F = kx \quad (7),$$

where k is a spring constant of the parallel hinge spring.

With reference now to the attached drawings, embodiments of the present invention will be explained in detail below.

Embodiment 1

Figure 1:
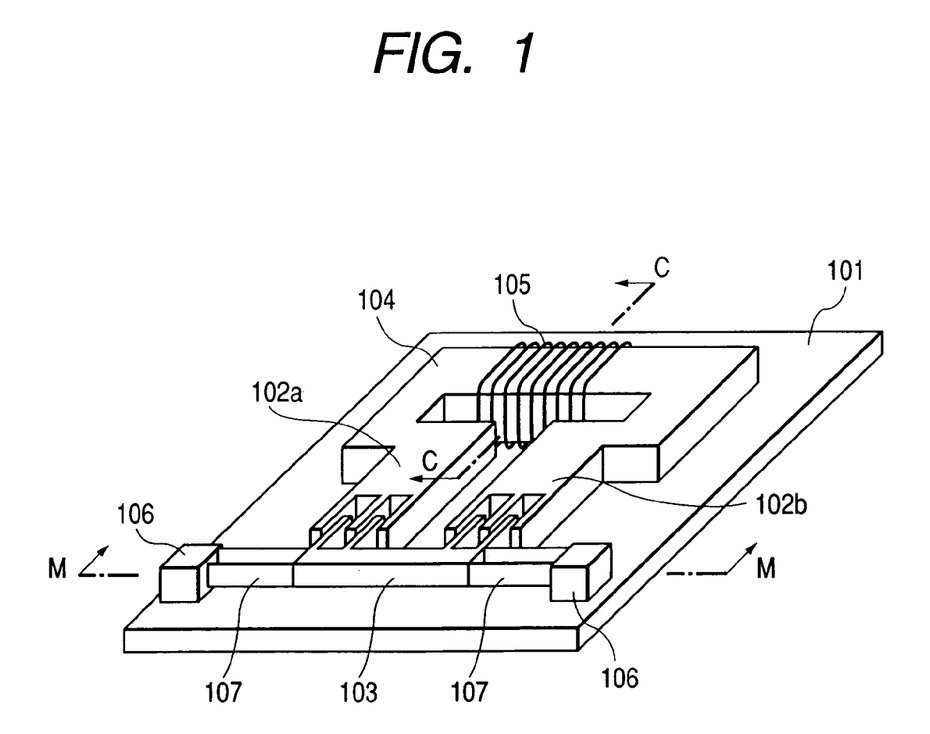
FIG. 1 is a drawing to explain a linear actuator of Embodiment 1 of the present invention.

FIG. 1 is a schematic diagram to explain the linear actuator of Embodiment 1 of the present invention. On a substrate 101, stators 102a and 102b, and support sections 106 are fixed. A movable element 103 is held at both ends by parallel hinge springs 107 and the parallel hinge springs 107 are held by the support sections 106. With such a configuration, the movable element 103 is supported onto the substrate 101 elastically with freedom of parallel translation.

Furthermore, a core 104 is placed so that both ends are magnetically connected to two stators 102a and 102b. A coil 105 is wound around core 104. The stators 102a and 102b and movable element 103 have comb-teeth-like protrusions, which are the features of the present invention and are placed in such a way that these protrusions engage with each other.

Figure 3:
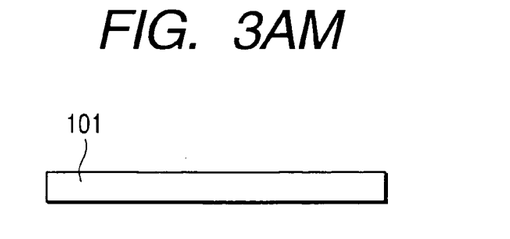

Then, the method of manufacturing the actuator of this embodiment will be explained. This embodiment uses a micro-machining technology to manufacture stators 102a and 102b, movable element 103, core 104, coil 105, support sections 106 and parallel hinge springs 107. Furthermore, coil 105 is manufactured in order of coil bottom face wiring 114 as the coil lower wiring, coil side wiring 115 and coil top face wiring 116 as the coil upper wiring. The manufacturing method will be explained in detail using FIGS. 3AM to 3JM and FIGS. 3AC to 3JC. FIGS. 3AM to 3JM and FIGS. 3AC to 3JC show respectively cross-sectional views along lines M—M and C—C in FIG. 1.

First, coil bottom face wiring 114 is patterned on substrate 101 and bottom face wiring-core insulting layer 117 is patterned on top of the coil bottom face wiring (FIGS. 3AM and 3AC).

Then, phospho-silica glass (PSG) layer 110 is patterned. The phospho-silica glass layer 110 will become the sacrificial layer and will be removed in a later process and will function to float parallel hinge springs 107 and movable element 103 from the substrate (FIGS. 3BM and 3BC).

Then, chromium is evaporated as a seed electrode layer 111 for electroplating and gold is evaporated on top of it (FIGS. 3CM and 3CC).

Then, a photoresist layer 112 is applied (FIGS. 3DM and 3DC). In this embodiment, SU-8 (manufactured by Micro Chem), which is suitable for thick coating, is used to obtain a coating thickness of 300 μm.

Then, the photoresist layer 112 is exposed and developed and patterning is performed (FIGS. 3EM and 3EC). The parts removed in this process will become female molds for stators 102a and 102b, movable element 103, core 104, support sections 106, parallel hinge springs 107 and coil side wiring 115.

Then, a permalloy layer 113 is electroplated while a voltage is applied to the seed electrode layer 111 (FIGS. 3FM and 3FC).

Then, the photoresist layer 112 and seed electrode layer 111 are removed by dry etching (FIGS. 3GM and 3GC).

Then, epoxy resin 119 is applied and the top surface is mechanically polished and flattened (FIGS. 3HM and 3HC).

Then, top face wiring-core insulating layer 118 and coil top face wiring 116 are patterned on the top face of the core 104 (FIGS. 3IM and 3IC).

Finally, the epoxy resin 119 and phospho-silica glass layer 110 are removed (FIGS. 3JM and 3JC).

The electromagnetic actuator configured as shown above of the present invention has less influence of displacement on the generated force under the condition of a constant current, and therefore its control is easier than the conventional electromagnetic actuator.

Moreover, since the generated force is never reduced inversely proportional to the square of the gap, it is possible to increase strokes.

Embodiment 2

Figure 4:
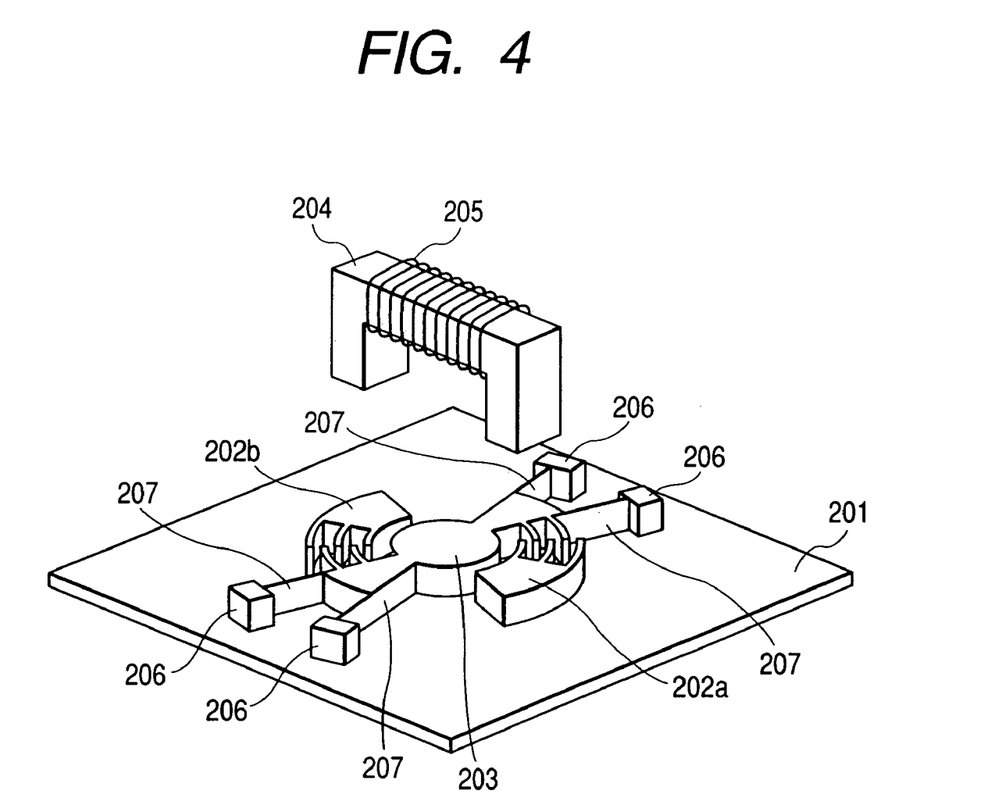
FIG. 4 is a drawing to explain a rotary actuator of Embodiment 2 of the present invention.

FIG. 4 is a schematic drawing to explain a rotary actuator of Embodiment 2 of the present invention. FIG. 4 shows a core 204 and a coil 205 separately to make it easier to see.

Stators 202a and 202b and support sections 206 are fixed onto a substrate 201. A rotor 203 is held at four corners by concentric rotary hinge springs 207. The concentric rotary hinge springs 207 are held by support sections 206. The concentric rotary hinge springs 207 are placed in such a way that its extensions in the longitudinal direction intersect at the center of the rotor 203.

With such a configuration, rotor 203 is supported onto the substrate 201 elastically with freedom of rotation on the substrate 201.

Moreover, a core 204 is placed in such a way that its both ends are magnetically connected to the two stators 202a and 202b. FIG. 4 shows the core 204 disassembled to make it easier to see. This core 204 has a coil 205 wound around. Furthermore, the stators 202a and 202b and the rotor 203 have concentric comb-teeth like protrusions, which are the features of the present invention and these protrusions are placed in such a way as to engage with each other.

The actuator of this embodiment is manufactured by first manufacturing the stators 202a and 202b, rotor 203, support sections 206 and concentric rotary hinge springs 207 on the substrate 201 using a micro-machining technology in the same way as that in Embodiment 1, and then assembling the core 204 that has been manufactured separately with the coil 205 wound around.

The actuator of this embodiment also operates according to the same principle as that for the actuator described in Embodiment 1. What is different from Embodiment 1 is that the rotor 203 rotates to be displaced because a couple of forces act on the rotor 203.

The electromagnetic actuator configured as shown above of the present invention has less influence of displacement on the generated force under the condition of a constant current, and therefore its control is easier than the conventional electromagnetic actuator.

Moreover, since the generated force is never reduced in inversely proportional to the square of the gap, it is possible to increase strokes.

Embodiment 3

Figure 5:
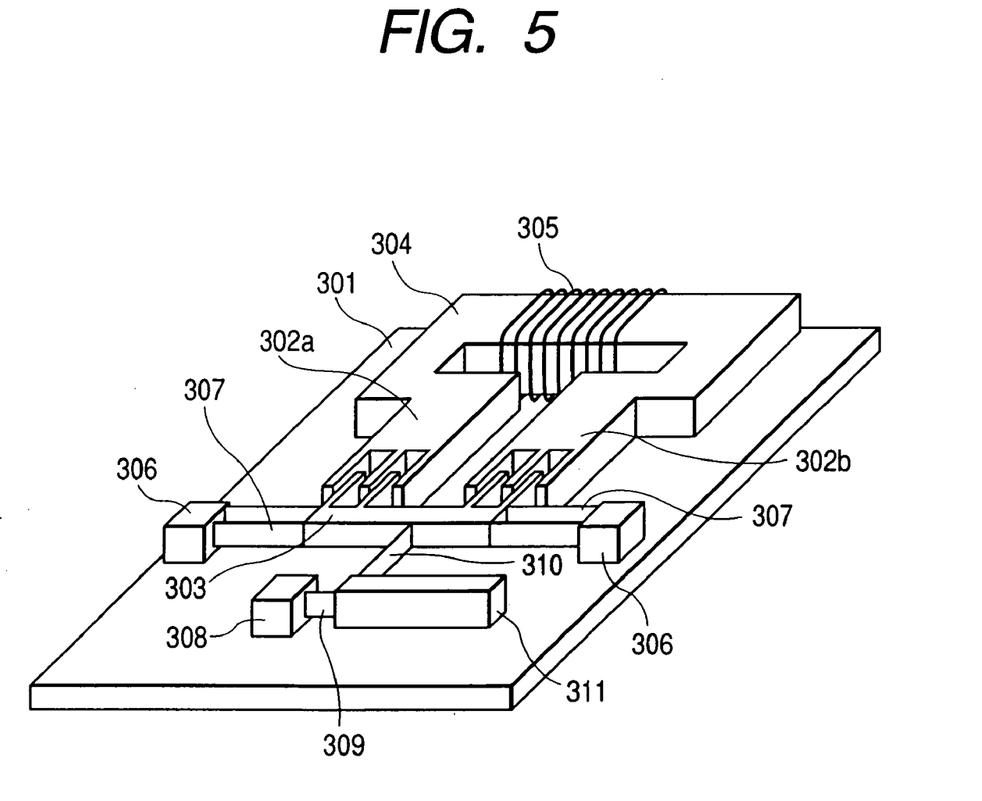
FIG. 5 is a drawing to explain an optical scanner of Embodiment 3 of the present invention.

FIG. 5 is a schematic diagram to explain an optical scanner of Embodiment 3 of the present invention.

Stators 302a and 302b, support sections 306 and mirror support section 308 are fixed onto a substrate 301.

A movable element 303 is held at both ends by parallel hinge springs 307 and the parallel hinge springs 307 are supported by support sections 306.

Configured in this way, the movable element 303 is supported onto the substrate 301 elastically with freedom of parallel translation.

A mirror 311 is connected to the mirror support section with a flat spring 309 and supported with freedom of rotation.

The mirror 311 is further linked with the movable element 303 with a flat spring 310. A core 304 is placed in such a way that its both ends are magnetically connected to the two stators 302a and 302b. This core 304 has a coil 305 wound around. The stators 302a and 302b and the movable element 303 have comb-teeth like protrusions, which are the features of the present invention, and these protrusions are placed in such a way as to engage with each other. These structures can be manufactured by the same process as that in Embodiment 1.

Figure 6A:
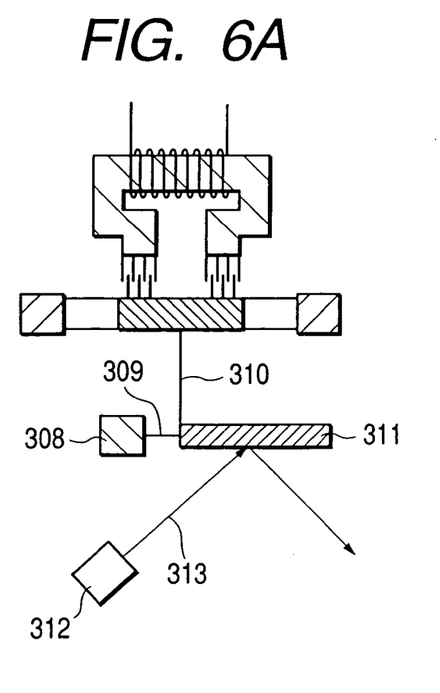
FIGS. 6A and 6B are drawings to explain operation of Embodiment 3 of the present invention.
Figure 6B:
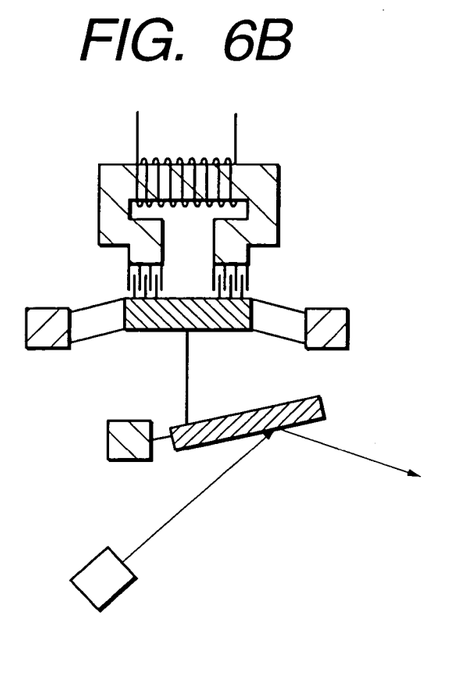

FIGS. 6A and 6B are drawings to explain an operation of this embodiment.

Reference numeral 312 denotes a semiconductor laser and 313 denotes a laser beam. The semiconductor laser 312 is placed in such a way that the laser beam 313 impinges on the mirror 311. The semiconductor laser 312 can be placed on the substrate 301 or in a different place.

FIG. 6A shows a situation when the coil 305 is not energized and FIG. 6B shows a situation when the coil 305 is energized. From these figures, it is clearly seen that the direction of the laser beam 313 changes by energizing the coil 305.

The electromagnetic actuator of the present invention has less influence of displacement on the generated force under the condition of a constant current, and therefore is characterized in that its control is easier than the conventional electromagnetic actuator.

Moreover, since the generated force is never reduced inversely proportional to the square of the gap, it is also characterized by the ability to increase strokes. Therefore, by applying the electromagnetic actuator of the present invention to an optical scanner, it is possible to provide an optical scanner with ease of control and a large angle of deflection that can be manufactured by a micro-machining technology.

As described above, the electromagnetic actuator of the present invention has less influence of displacement on the generated force of the actuator under the condition of a constant current, it is extremely easy to control the electromagnetic actuator of the present invention compared to the conventional electromagnetic actuator.

Furthermore, since the generated force of the actuator of the present invention is never reduced inversely proportional to the square of the gap, it is possible to increase strokes.

Moreover, the present invention adopts a configuration manufacturing the supporting means of the movable element and stators fixed onto the substrate, making it possible to easily manufacture the electromagnetic actuator using a micro-machining technology.

Furthermore, the present invention adopts a configuration creating the supporting means and fixed and movable magnetic poles from the same material, making it possible to manufacture them all together at a time.

Moreover, the present invention configures the supporting means with parallel hinge springs, providing directly operated support, free of friction and backlash.

Furthermore, the present invention can create an optical scanner made of a movable mirror and an electromagnetic actuator mechanically connected to the movable mirror through micro machining, making it possible to implement an optical scanner withe ease of control and a large angle of deflection.

What is claimed is:

1. An electromagnetic actuator comprising:
   a core with a coil wound around said core;
   two stators magnetically coupled to each end of said core;
   a movable element opposed to said stators with two air gaps; and
   supporting means for supporting said movable element to be displacable relative to said two stators,
   wherein said stators and said movable element are made of the same material, and
   wherein said two stators and said movable element have a projection and a depression in said two air gaps in such a way that the projection and depression of said stators engage with the projection and depression of said movable element, side surfaces of the projection and depression being parallel to the displacement direction of the movable element and partially overlapping even if there is no electromagnetic force.

2. The electromagnetic actuator according to claim 1, wherein said supporting means said stators are fixed onto a substrate.

3. An optical scanner, comprising:
   a movable mirror; and
   the electromagnetic actuator according to claim 2 mechanically connected with said movable mirror.

4. The electromagnetic actuator according to claim 1, wherein said supporting means is a parallel hinge spring made up of a plurality of flat springs combined in parallel, and the projections and depressions of said stators and the projections and depressions of said movable element are formed like comb-teeth parallel to the direction of movement of said parallel hinge spring.

5. The electromagnetic actuator according to claim 1, wherein said supporting means is a concentric hinge spring combining a plurality of flat springs in a concentric radial form, and the projections and depressions of said stators and the projections and depressions of said movable element are formed in a concentric form around the center of rotation of said concentric hinge spring.

6. An optical scanner, comprising:
   a movable mirror; and
   the electromagnetic actuator according to claim 1 mechanically connected with said movable mirror.

7. An optical scanner, comprising:
   a movable mirror; and
   the electromagnetic actuator according to claim 1 mechanically connected with said movable mirror.

8. An optical scanner, comprising:
   a movable mirror; and
   the electromagnetic actuator according to claim 4 mechanically connected with said movable mirror.

9. An optical scanner, comprising:
   a movable mirror; and
   the electromagnetic actuator according to claim 5 mechanically connected with said movable mirror.

* * * * *

UNITED STATES PATENT AND TRADEMARK OFFICE
CERTIFICATE OF CORRECTION

PATENT NO. : 6,943,928 B1
DATED : September 13, 2005
INVENTOR(S) : Susumu Yasuda et al.

It is certified that error appears in the above-identified patent and that said Letters Patent is hereby corrected as shown below:

Title page,
Item [57], ABSTRACT,
Line 3, "a" should be deleted.

Column 7,
Line 36, "means said stators" should read -- means and said stators --.

Signed and Sealed this

Twenty-fourth Day of January, 2006

JON W. DUDAS
*Director of the United States Patent and Trademark Office*